US006667093B2

(12) United States Patent
Yuan et al.

(10) Patent No.: US 6,667,093 B2
(45) Date of Patent: Dec. 23, 2003

(54) INK-JET PRINTABLE TRANSFER PAPERS FOR USE WITH FABRIC MATERIALS

(75) Inventors: Shengmei Yuan, Coventry, RI (US); Zhong Xu, Worcester, MA (US); Sathuan K. Sa, Cranston, RI (US)

(73) Assignee: Arkwright Incorporated, Fiskeville, RI (US)

( * ) Notice: Subject to any disclaimer, the term of this patent is extended or adjusted under 35 U.S.C. 154(b) by 154 days.

(21) Appl. No.: 09/838,654

(22) Filed: Apr. 19, 2001

(65) Prior Publication Data

US 2002/0192434 A1 Dec. 19, 2002

(51) Int. Cl.[7] .................................... B32B 23/02
(52) U.S. Cl. .................... 428/195; 428/423.1; 428/327; 430/138
(58) Field of Search ................................ 428/195, 327, 428/423.1; 430/138

(56) References Cited

U.S. PATENT DOCUMENTS 4,224,358 A 9/1980 Hare
4,284,456 A 8/1981 Hare
4,966,815 A 10/1990 Hare
4,980,224 A 12/1990 Hare
5,139,917 A 8/1992 Hare
5,236,801 A 8/1993 Hare
5,242,739 A 9/1993 Kronzer et al.
5,271,990 A 12/1993 Kronzer et al.
5,372,884 A 12/1994 Abe et al. ................... 428/331
5,501,902 A 3/1996 Kronzer
5,521,229 A 5/1996 Lu et al. ....................... 522/40
5,620,548 A 4/1997 Hare
5,665,476 A 9/1997 Oez ........................ 428/488.4
5,798,179 A 8/1998 Kronzer
5,833,790 A 11/1998 Hare
5,948,586 A 9/1999 Hare
6,017,611 A 1/2000 Cheng et al.
6,033,824 A 3/2000 Hare et al.
6,036,808 A 3/2000 Shaw-Klein et al.
6,083,656 A 7/2000 Hare et al.
6,087,061 A 7/2000 Hare et al.
6,177,187 B1 * 1/2001 Niemoller et al. .......... 428/195
6,242,082 B1 * 6/2001 Mukoyoshi et al. ........ 428/211

FOREIGN PATENT DOCUMENTS

WO WO 97/33763 9/1997
WO WO 98/30749 7/1998
WO WO 00/73570 A1 12/2000

OTHER PUBLICATIONS

Ink–Jet Transfer Systems, process for their Preparation and use thereof for a Printing Process, U.S. patent application No. 09/341,279.

* cited by examiner

*Primary Examiner*—Cynthia H. Kelly
*Assistant Examiner*—Tamra L Dicus
(74) *Attorney, Agent, or Firm*—Barlow, Josephs & Holmes, Ltd.

(57) ABSTRACT

The present invention relates to ink-jet transfer papers that can be printed with images using ink-jet printers. The ink-jet printable transfer papers comprise a support paper having a surface coated with layer (a) and ink-receptive layer (b). Layer (a) comprises a polyurethane binder and inorganic pigment, and layer (b) comprises a polyurethane binder and organic polymeric particles. The printed image can be heat-transferred to fabric materials particularly dark-colored fabrics such as black T-shirts.

17 Claims, No Drawings

INK-JET PRINTABLE TRANSFER PAPERS FOR USE WITH FABRIC MATERIALS

BACKGROUND OF THE INVENTION

1. Field of the Invention

The present invention relates to ink-jet transfer papers that can be printed with images using ink-jet printers. The printed image can be heat-transferred to fabric materials. The ink-jet transfer papers are particularly suitable for transferring images to dark-colored fabrics such as black T-shirts.

2. Brief Description of the Related Art

Consumers' interest in T-shirts, sweatshirts, and other fabric materials with customized images (i.e., photos, messages, illustrations, and the like) continues to grow in the United States and elsewhere. Today, consumers use personal computers and desktop printers to create images on a variety of fabrics. Generally, the process involves generating a computerized image and sending it to an ink-jet printer that prints the image onto an ink-jet transfer paper. Commercially-available ink-jet transfer papers typically comprise a support (release) paper having a surface coated with a "hot-melt" layer and "ink-receptive" imaging layer that overlays the "hot-melt" layer.

Various methods can be used to transfer the image to the fabric. In one instance, a person places the imaged paper over the fabric so that the image is facing down. Then, the person irons the back surface of the paper with a hand iron. After completely transferring the image onto the fabric, the person removes the support paper after it has cooled or while it is still hot. The surface of the support paper may be coated with silicone so that a person can easily peel the paper off after it has cooled. Ink-jet transfer papers having a silicone coating are commonly referred to as "cold-peel" papers. Ink-jet transfer papers that do not possess a silicone or other non-stick coating are commonly referred to as "hot-peel" papers, since they are peeled-off the fabric while the paper is still hot.

Hare et al., U.S. Pat. No. 6,087,061 discloses methods for applying an image to a fabric. The patent discloses that one embodiment relates to cold peel. The transfer sheet may comprise a support having a first and second surface, wherein silicone is provided on the first surface beneath a coating capable of receiving an image. The coating may be imaged with an ink-jet printer, thermal wax ribbon printer, or copier. The coating is then peeled from the transfer sheet. The peeled coating is positioned on a fabric, and a silicone sheet is then positioned over the peeled coating. The silicone sheet is hand-ironed to drive the coating into the fabric.

Kronzer, U.S. Pat. No. 5,798,179 discloses ink-jet printable heat-transfer papers for applying computer-generated graphics onto clothing. The patent discloses that the transfer paper has cold release properties and is coated with multiple layers comprising thermoplastic polymers and film-forming binders. The patent discloses that one layer may include thermoplastic polymer particles selected from the group consisting of polyolefins, polyesters, polyamides, and ethylene-vinyl acetate copolymers. The layer may also include a film-forming binder The patent discloses suitable binders as including polyacrylates, polyethylene, and ethylene-vinyl acetates. Table IV of the patent describes a layer containing polyamide particles (ORGASOL) and a heat-sealable polyurethane (SANCOR 12676).

Kronzer, U.S. Pat. No. 5,501,902 discloses ink-jet printable heat-transfer materials having a first layer (e.g., film or paper), and a second layer overlaying the first layer. The second layer comprises a film-forming binder such as a polyacrylate, polyethylene, or ethylene-vinyl acetate copolymer, and particles of a thermoplastic polymer having dimensions of less than 50 micrometers. The patent discloses that the powdered thermoplastic polymer is desirably selected from the group consisting of polyolefins, polyesters, and ethylene-vinyl acetate copolymers. Further, the second layer may comprise a cationic polymer (e.g., an amide-epichlorohydrin polymer), a humectant (e.g., ethylene glycol or polyethylene glycol), ink-viscosity modifier (e.g., polyethylene glycol), a weak acid (e.g., citric acid), and/or a surfactant.

Today, most inkjet transfer papers are designed for use with light-colored fabrics, e.g., white T-shirts.

Published PCT International Application WO 98/30749 discloses an ink-jet transfer system for applying graphic presentations, patterns, images, or typing onto light-colored clothing articles. The ink-jet transfer system comprises a carrier material (e.g., a silicone-coated or non-coated paper), a hot-melt layer overlaying the carrier material, and an ink-receiving layer overlaying the hot-melt layer.

The hot-melt layer is wax-like and may comprise a dispersion of an ethylene/acrylic acid copolymer. The ink-receiving layer comprises a binder (preferably a soluble polyamide) and a highly porous pigment (preferably a polyamide pigment).

For dark-colored fabrics, e.g., black T-shirts, a white background must be created on the fabric so that the transferred image may be seen.

Published PCT International Application WO 00/73570 A1 discloses an ink-jet transfer system for dark textile substrates. The ink-jet transfer system comprises a carrier material (e.g., a silicone-coated or non-coated paper), an adhesive layer overlaying the carrier material, a white background layer overlaying the adhesive layer, and an ink-receiving layer overlaying the white background layer. The adhesive layer is preferably a hot-melt layer comprising a dispersion of an ethylene/acrylic acid copolymer or polyurethane dispersion. Polyester particles having a granular size of less than 30 μm are dispersed in the adhesive layer. The white background layer comprises permanent elastic plastics that do not melt at temperatures typically used for ironing (up to about 220° C.). Preferred elastic plastics are selected from the group consisting of polyurethanes, polyacrylates, polyalkylenes, or natural rubber. White pigments (e.g., $BaSO_4$, ZnS, $TiO_2$, or SbO) are dispersed in the white background layer. The ink-receiving layer comprises a binder and a highly porous pigment (preferably a polyamide pigment). The patent discloses the following compounds as suitable binders in the ink-receiving layer: polyacrylate, styrollbutadiene copolymers, nylon, nitrile rubber, PVC, PVAC and ethylene/acrylate copolymers. The patent discloses that a polyamide binder is preferably used.

Some commercially-available ink-jet transfer papers, e.g., the papers described in the above-mentioned published PCT International Application WO 00/73570 A1, can provide images having satisfactory color quality on dark-colored fabrics. However, consumers are demanding transfer papers that will provide images having improved wash-durability and color quality. Wash-durability is a particular problem with many conventional ink-jet transfer papers. With such papers, after repeated washings and dryings of the fabric, the transferred image may develop cracks and colors may fade. In view of such problems, an ink-jet transfer paper capable of providing images having improved color quality and wash-durability on dark-colored fabrics is desirable. The present invention provides such an ink-jet transfer paper.

SUMMARY OF THE INVENTION

The present invention relates to an ink-jet printable transfer paper, comprising a support paper having a surface coated with layer (a) and ink-receptive layer (b). Layer (a) comprises a polyurethane binder and inorganic pigment, and layer (b) comprises a polyurethane binder and organic polymeric particles. In one embodiment, the support paper is first coated with a release layer comprising silicone. In another embodiment, a hot-melt second layer comprising a thermoplastic polymer is coated over the silicone layer.

Preferably, the polyurethane binder in layer (a) has a softening point in the range of 120° to 190° C., and the polyurethane binder in layer (b) has a softening point in the range of 50° to 190° C. The polyurethane binder comprising layer (b) may contain cationic groups.

Suitable inorganic pigments include silica, alumina, titanium dioxide, zinc sulfide, zinc oxide, antimony oxide, barium sulfate, and calcium carbonate. Preferably, titanium dioxide pigment is used.

Suitable organic polymeric particles include polyamides, polyolefins, and polyesters. Preferably, the organic polymeric particles are polyamide particles having a particle size distribution containing particles with a diameter size in the range of 5 μm to 50 μm and a surface area in the range of 10 $m^2$/g to 40 $m^2$/g.

Typically, the total weight of layers (a) and (b) is in the range of 50 to 100 grams per square meter, and the total thickness of the support paper is in the range of about 2 mils to about 10 mils.

Suitable thermoplastic polymers for the hot-melt layer include polyamides, polyolefins, polyesters, poly(vinyl chloride), poly(vinyl acetate), polyacrylates, acrylic acid, methacrylic acid, and copolymers and mixtures thereof. Preferably, an ethylene/acrylic acid copolymer is used.

Also, the present invention encompasses a method for applying an image to a fabric material using the above-described ink-jet printable transfer paper. The method comprises the steps of: 1) printing an image on the coated layers with an ink-jet printer, 2) removing the support paper from the imaged coating layers, 3) placing the imaged coating layers on a fabric material, 4) placing a protective paper (e.g., a silicone-coated transparent paper) over the imaged coating layers on the fabric material, and 5) ironing the protective paper, whereby the image is transferred to the fabric.

The ink-jet printable transfer papers are particularly suitable for producing images on black colored T-shirts.

DETAILED DESCRIPTION OF THE PREFERRED EMBODIMENT

The present invention relates to ink-jet printable transfer papers comprising a support paper having a surface coated with at least two layers (a) and (b). Layer (a) comprises a polyurethane binder and inorganic pigment. Layer (b) comprises a polyurethane binder and organic polymeric particles.

The ink-jet transfer papers of this invention can be made using any suitable support paper (substrate). Examples of suitable support papers include plain papers, clay-coated papers, and resin-coated papers such as polyethylene-coated papers and latex-impregnated papers. The thickness of the support paper may vary, but it is typically in the range of about 2 mils (51 μm) to about 10 mils (254 μm). The support paper has a front surface and a back surface. A design, product trademark, company logo, or the like may be printed on the back surface of the paper. The front surface, i.e., imaging surface, of the paper is coated with layers as described below.

Layer (a) is a substantially opaque layer comprising a polyurethane binder and inorganic pigment. Preferably, a polyurethane binder having a softening point in the range of 120° to 190° C. and inorganic white pigment are used. Examples of suitable white pigments include silica, alumina, titanium dioxide, zinc sulfide, zinc oxide, antimony oxide, barium sulfate, calcium carbonate, and the like.

Generally, layer (a) comprises about 30 to about 95 percent by weight and preferably 60 to 80 weight % polyurethane based on weight of the layer. In addition, layer (a) generally comprises about 5 to about 70 percent by weight and preferably 10 to 40 weight % inorganic pigment based on weight of the layer. Suitable polyurethane binders that are commercially available include SANCURE 12929 and SANCURE 825 (polyurethane dispersions) from B.F. Goodrich Company. Suitable white pigments that are commercially available include TINT AYD (titanium dioxide) from Daniel Products Company, Inc.

Layer (b) is an ink-receptive layer comprising a polyurethane binder and organic polymeric particles. The ink-receptive layer is capable of absorbing aqueous-based inks from an ink-jet printer to form an image. Most inks used in ink-jet printing devices are aqueous-based inks containing molecular dyes or pigmented colorants. Water is the major component in aqueous-based inks. Small amounts of water-miscible solvents such as glycols and glycol ethers may also be present.

Preferably, the polyurethane binder used in the ink-receptive layer has a softening point in the range of 50° to 190° C. Suitable polyurethane elastomers that are commercially available include WTCO W-213 from C.K. Witco Corp. More preferably, the polyurethane binder contains cationic functional groups. It is believed that such cationic groups are capable of reacting with and stabilizing anionic dyestuffs found in aqueous-based inks.

Suitable organic polymeric particles include, for example, polyolefin, polyamide, and polyester particles. Preferably, substantially porous thermoplastic particles having a high surface area are used. These particles are better able to absorb water and water-miscible solvents contained in aqueous-based inks. For example, the particles may have a particle size distribution containing particles with a diameter size in the range of 5 μm to 50 μm and a surface area in the range of 10 $m^2$/g to 40 $m^2$/g. A particularly preferred particulate material is ORGASOL (polyamide particles) available from Elf Atochem North America, Inc.

Generally, ink-receptive layer (b) comprises about 10 to about 90 percent by weight and preferably 10 to 40 weight % polyurethane based on weight of the layer. In addition, ink-receptive layer (b) generally comprises about 90 to about 10 percent by weight and preferably 60 to 90 weight % organic particles based on weight of the layer.

Ink-receptive layer (b) is coated over layer (a) on the support paper. In some instances, one or more intermediate coating layers may be located between layers (b) and (a). Also, it may be desirable to coat the support paper with one or more primer coatings before applying layers (a) and (b). For example, the front surface of the support paper is preferably coated with a stick-resistant composition such as silicone, and layers (a) and (b) are coated over the stick-resistant coating layer. Although a stick-resistant coating is not required, it allows a person to peel away the support paper from layers (a) and (b) more easily as described in further detail below.

In another preferred embodiment, a "hot-melt" layer is coated over the stick-resistant coating, and layers (a) and (b) are coated over the hot-melt coating layer. The hot-melt layer may serve many functions. For example, the hot-melt layer may act as an adhesive-like layer preventing delamination of the coating layers from the support paper. In addition, as described further below, an ordinary hand iron is used to heat-transfer the image to the fabric using an ordinary hand iron. The hot-melt layer and image are heat-transferred to the fabric by means of pressing the hot-melt layer into the fabric with the hot iron. The hot-melt layer helps the transferred image adhere to the fabric. Preferably, the hot-melt layer comprises a thermoplastic polymer. Suitable thermoplastic polymers include, for example, polyamides, polyolefins, polyesters, poly(vinyl chloride), poly(vinyl acetate), polyacrylates, polystyrene, acrylic acid, methacrylic acid, and copolymers and mixtures thereof. Preferably, the thermoplastic polymer has a melting point in the range of 60° C. to 180° C. More preferably, an ethylene/acrylic acid, ethylene/methacrylic acid, or ethylene/vinyl acetate copolymer is used. For example, ENOREX VN 379 (an aqueous dispersion containing polymers and copolymers of acrylic acid, ethylene, methyl methacrylate, and 2-ethyl hexylacrylate, and ammonia), available from Collano Ebnöther AG, can be used. MICHEM 4983 RHS (an ethylene/acrylate copolymer), available from Michelman, Inc., can be used. Also, polyurethane compositions can be used o form the hot-melt layer.

As shown in the following examples, the ink-jet transfer papers of this invention can be used to provide images having good print-quality, color-fastness, and wash-durability on fabric materials. It is believed that the finished fabric has such properties partly because of the compatibility and synergy of layers (a) and (b). The polyurethane binder in layer (a) may be similar or even identical to the polyurethane binder in layer (b). Although not wishing to be bound by any theory, it is noted that interfacial interaction between layers containing similar or identical binders can be superior to interaction between layers containing substantially different binders. This interfacial interaction may be enhanced when the medium is heated during application of the image to the fabric. Improved interfacial interaction could enhance adhesion between the layers. As adhesion improves and the layers seal together, there should be less dye diffusion between the layers, and color-fastness of the imaged material should improve. Further, as the layers seal together, mechanical strength and durability of the material should improve even while the material is in a wet state, e.g., during laundering.

In the present invention, it has been found that polyurethane elastomers are particularly effective. Polyurethane elastomers have a relatively high reversible elongation under stress. It is believed that these elastic properties help prevent cracks from developing in the transferred image on the fabric material. Further, polyurethane elastomers contain hydrophilic domains that can provide good ink-wetting and dye-fixing properties in contrast to more hydrophobic polymers such as polyethylene. In addition, polyurethane elastomers tend to have low softening points in contrast to other polymers, such as polyamides, that have relatively high melting points. It is believed that such low softening points help provide a more effective transfer and fixing of the image to the fabric at low temperatures. For example, the image can be transferred effectively at a temperature in the range of 120° to 170° C. which is the common temperature range for household irons.

It is recognized that the coating layers on the support paper may contain additives such as surface active agents that control the wetting or flow behavior of the coating solutions, antistatic agents, suspending agents, antifoam agents, acidic compounds to control pH, optical brighteners, UV blockers/stabilizers, and the like.

Conventional coating techniques can be used to apply the layers to the support paper. For example, roller, blade, wire bar, dip, solution-extrusion, air-knife, and gravure coating techniques can be used. Typically, the total weight of the coating layers is in the range of 50 to 100 grams per square meter (gsm) and preferably 70 to 90 gsm. The coating layers may be dried in a conventional oven.

The ink-jet transfer papers of this invention can be printed with an image using any conventional ink-jet printer. For example, ink-jet printers made by Océ, Hewlett-Packard, Epson, Encad, Canon, and others can be used.

The printed image can be transferred to the fabric material by various methods. Any colored fabric may be used including white fabrics. The ink-jet transfer papers of this invention are particularly suitable for transferring images to dark-colored fabrics, e.g., black T-shirts.

Preferably, the image is heat-transferred to the fabric using an ordinary household iron. A preferred method involves the following steps:

peeling the support paper from the imaged coatings so that the imaged coatings remain as a film-like material;

placing the imaged coatings (film-like material) on the fabric so that the image faces-up (i.e., the image is exposed; it is not face-down against the fabric);

placing a sheet of protective paper over the image;

hand-ironing the protective paper so that the imaged coatings are pressed into the fabric and the image is transferred to the fabric; and removing the protective paper after cooling.

The sheet of protective paper used in step (c) is preferably a stick-resistant transparent paper, e.g., a silicone-coated tissue paper. A person can easily remove such papers from the fabric after the ironing step. The support paper that is peeled away from the imaged coatings in step (a) should not be used again as the protective paper in step (c). It is not recommended that the peeled-off support paper be used, because, among other deficiencies, it may curl up along its edges during the ironing step. Rather, the protective paper should be a fresh sheet. Transparent sheets of paper offer several advantages. Particularly, if a transparent sheet is used, the person ironing the sheet can better observe the image as it transfers to the fabric, and he or she can avoid under or over-heating the fabric. If too little heat is applied, the image does not completely transfer and the image may peel away from the fabric. If too much heat is applied, burn marks may appear on the image and fabric.

The present invention is further illustrated by the following examples using the below-described test methods, but these examples should not be construed as limiting the scope of the invention.

Test Methods

Print-Quality

The ink-jet transfer papers were printed with multicolor test patterns using several different desktop ink-jet printers and printing modes as described in Table I below. Then, the printed ink-jet transfer papers were visually inspected to determine print quality. The print quality of images having significant inter-color bleeding was considered poor. The print quality of images having little or no inter-color bleeding was considered good.

TABLE I

| Ink-Jet Printers | Printing Paper Mode |
|---|---|
| HP970 | Iron-on T-shirt transfer |
| HP720 | Premium IJ paper |
| Epson Stylus Color 900 | 360 dpi IJ paper |
| Epson Stylus Color 800 | 360 dpi IJ paper |
| Canon BJC-5100 | T-shirt transfer media/high printing quality |
| Lexmark 5700 | Iron-on transfer/1200 dpi |

Ironing

A printed image was heat-transferred to black 100% cotton T-shirts using an ordinary household hand iron per the above-described preferred method. The iron was set at "maximum cotton" and heated. The hot iron was applied to the silicone-coated protective paper using moderate pressure for about two (2) to three (3) minutes. After cooling for about three (3) to five (5) minutes, the silicone-coated protective paper was peeled away from the T-shirt.

Color-Fastness and Wash-Durability

After about twenty-four (24) hours, the above-described ironed T-shirts were washed and dried under the following conditions:

Kenmore 70 Series Heavy Duty Washer

Speed (Agitate/Spin)—Delicate (slow/slow)
Water Temp. (Wash/Rinse)—Cold/Cold
Water Level—Small to medium load
Washing—Ultra clean 10 cycle Kenmore Heavy Duty Dryer Setting—Knit/Delicate The above washing and drying cycle was repeated five (5) times. Then, the printed T-shirts were visually inspected to determine color-fastness of the image (poor, fair, or good). Images having significant color fading were considered to have poor color-fastness, while images having little or no color fading were considered to have good color-fastness.

Also, the imaged T-shirts were also visually inspected to determine their wash-durability (poor, fair, or good). T-shirts having significant cracking or delamination in the images were considered to have poor wash-durability, while T-shirts having little or no cracking in the images were considered to have good wash-durability.

EXAMPLES

In the following examples, percentages are by weight based on the weight of the coating formulation, unless otherwise indicated.

Example 1

The following coating formulations were prepared.

| | Weight % |
|---|---|
| Hot Melt Layer | |
| ENOREX VN 379[1] | 100% |
| White Layer | |
| SANCURE 12929[2] | 84% |
| TINT AYD NV7003[3] | 15.4% |
| BYK 348[4] | 0.6% |
| Ink-Receptive Layer | |
| WITCO W-213[5] | 18% |
| ORGASOL[6] | 22% |
| WATER | 16% |
| ETHANOL | 43% |

[1]Polyethylene copolymers dispersion, available from Collano Ebnöther AG (Switzerland)
[2]Polyurethane dispersion, available from B. F. Goodrich Co.
[3]Titanium dioxide pigment, available from Daniel Products, New Jersey
[4]Surfactant, available from BYK-Chemie USA.
[5]Polyurethane dispersion, available from C. K. Witco Corp.
[6]Polyamide resin particles, available from Elf Atochem North America, Inc.

Example 2

The following coating formulations were prepared.

| | Weight % |
|---|---|
| Hot Melt Layer | |
| Tecseal E-428/50[7] | 100% |
| White Layer | |
| SANCURE 12929[2] | 84% |
| TINT AYD NV7003[3] | 15.4% |
| BYK 348[4] | 0.6% |
| Ink-Receptive Layer | |
| WITCO W-2135 | 19% |
| ORGASOL[6] | 22% |
| WATER | 16% |
| ETHANOL | 43% |

[7]Polyethylene copolymers dispersion, available from Trub Emulsions Chemie AG (Switzerland)

Example 3

The following coating formulations were prepared.

| | Weight % |
|---|---|
| Hot Melt Layer | |
| Michem 4983[8] | 98% |
| BYK 348[4] | 2% |
| White Layer | |
| SANCURE 12929[2] | 84% |
| TINT AYD NV7003[3] | 15.4% |
| BYK 348[4] | 0.6% |

-continued

| | Weight % |
|---|---|
| Ink-Receptive Layer | |
| WITCO W-213[5] | 19% |
| ORGASOL[6] | 22% |
| WATER | 16% |
| ETHANOL | 43% |

[8]Polyethylene copolymer dispersion, available from Michelman, Inc., Ohio

Example 4

The following coating formulations were prepared.

| | Weight % |
|---|---|
| Hot Melt Layer | |
| Michem 4983[8] | 98% |
| BYK 348[4] | 2% |
| White Layer | |
| SANCURE 12929[2] | 84% |
| TINT AYD NV7003[3] | 15.4% |
| BYK 348[4] | 0.6% |
| Ink-Receptive Layer | |
| Sancure 2104[9] | 24.5% |
| ORGASOL[6] | 22% |
| WATER | 14.5% |
| ETHANOL | 39% |

[9]Polyurethane dispersion, available from B. F. Goodrich Co.

Example 5

The following coating formulations were prepared.

| | Weight % |
|---|---|
| Hot Melt Layer | |
| Michem 4983[8] | 98% |
| BYK 348[4] | 2% |
| White Layer | |
| Witcobond W-507[10] | 84% |
| TINT AYD NV7003[3] | 15.4% |
| BYK 348[4] | 0.6% |
| Ink-Receptive Layer | |
| WITCO W-213[5] | 18% |
| ORGASOL[6] | 22% |
| WATER | 16% |
| ETHANOL | 43% |

[10]Polyurethane dispersion, available from C. K. Witco Corp.

Example 6

The following coating formulations were prepared.

| | Weight % |
|---|---|
| Hot Melt Layer | |
| Michem 4983[8] | 98% |
| BYK 348[4] | 2% |

-continued

| | Weight % |
|---|---|
| White Layer | |
| Sancure 2255[11] | 84% |
| TINT AYD NV7003[3] | 15.4% |
| BYK 348[4] | 0.6% |
| Ink-Receptive Layer | |
| WITCO W-213[5] | 18% |
| ORGASOL[6] | 22% |
| WATER | 16% |
| ETHANOL | 43% |

[11]Polyurethane dispersion, available from B. F. Goodrich Co.

In the above examples, the hot melt formulation was first applied to a silicone-coated support paper using a Meyer metering rod and dried in an oven at 110° C. for about 3 minutes. The white background coating formulation was then applied over the hot-melt layer using a Meyer metering rod and dried in an oven at 110° C. for about 3 minutes. Finally, the image coating formulation was applied over the white background layer using a Meyer metering rod and dried in an oven at 110° C. for about 3 minutes. Per the Test Methods described above, images (prints) were produced on the ink-jet transfer papers, and the imaged T-shirts were evaluated for print-quality, color-fastness, and wash-durability. The results are reported below in Table II.

Comparative Example A

COPYFANTASY CTM 60 ink-jet transfer papers, manufactured by Messerli (CH-8152 Glattbrugg/Switzerland), were tested per the Test Methods described above. Per the Test Methods described above, images (prints) were produced on the COPYFANTASY CTM 60 ink-jet transfer papers, and the imaged T-shirts were evaluated for print-quality, color-fastness, and wash-durability. The results are reported below in Table II.

TABLE II

| Sample* | Print-Quality | Color-Fastness | Wash-Durability |
|---|---|---|---|
| Example 1 | Good | Good | Fair |
| Example 2 | Good | Good | Fair |
| Example 3 | Good | Good | Good |
| Example 4 | Fair | Good | Good |
| Example 5 | Good | Fair | Good |
| Example 6 | Good | Fair | Fair |
| Comp. Ex. A | Poor | Poor | Fair |

*In each Example, three (3) T-shirts were inspected, and the average rating is reported.

What is claimed is:

1. An ink-jet printable transfer paper for transferring an image to a fabric material, comprising a support paper having a surface coated with:

a hot-melt layer comprising a thermoplastic polymer having a melting point in the range of 60° to 180° C., a substantially opaque layer (a) comprising a polyurethane binder and inorganic white pigment, and ink-receptive layer (b) comprising a polyurethane binder and organic polymeric particles.

2. The ink-jet printable transfer paper of claim 1, wherein the polyurethane binder comprising layer (a) has a softening point in the range of 120° to 190° C.

3. The ink-jet printable transfer paper of claim 1, wherein the inorganic pigment comprising layer (a) is selected from the group consisting of silica, alumina, titanium dioxide, zinc sulfide, zinc oxide, antimony oxide, barium sulfate, and calcium carbonate.

4. The ink-jet printable transfer paper of claim 3, wherein the pigment is titanium dioxide.

5. The ink-jet printable transfer paper of claim 1, wherein the polyurethane binder comprising layer (b) has a softening point in the range of 50° to 190° C.

6. The ink-jet printable transfer paper of claim 5, wherein the polyurethane binder comprising layer (b) contains cationic groups.

7. The ink-jet printable transfer paper of claim 1, wherein the organic polymeric particles comprising layer (b) are selected from the group consisting of polyamides, polyolefins, and polyesters.

8. The ink-jet printable transfer paper of claim 7, wherein the thermoplastic polymeric particles are polyamide particles having a particle size in the range of 5 μm to 50 μm and a surface area in the range of 10 $m^2/g$ to 40 $m^2/g$.

9. The ink-jet printable transfer paper of claim 1, wherein the total weight of layers (a) and (b) is in the range of 50 to 100 grams per square meter.

10. The ink-jet printable transfer paper of claim 1, wherein the thickness of the support paper is in the range of about 2 mils to about 10 mils.

11. An ink-jet printable transfer paper for transferring an image to a fabric material, comprising a support paper having a surface coated with:

a) a first layer comprising silicone, b) a hot-melt second layer comprising a thermoplastic polymer having a melting point in the range of 60° to 180° C., said second layer overlaying the first layer, c) a substantially opaque third layer comprising a polyurethane binder and inorganic white pigment, said third layer overlaying said second layer, and d) an ink-receptive fourth layer comprising a polyurethane binder and organic particles, said fourth layer overlaying said third layer.

12. The ink-jet printable transfer paper of claim 11, wherein the second layer comprises a thermoplastic polymer selected from the group consisting of polyamides, polyolefins, polyesters, poly(vinyl chloride), poly(vinyl acetate), polyacrylates, acrylic acid, methacrylic acid, and copolymers and mixtures thereof.

13. The ink-jet printable transfer paper of claim 12, wherein the second layer comprises ethylene/acrylic acid copolymer.

14. A method for applying an image to a fabric material, comprising the steps of:

a) providing an ink-jet printable transfer paper, comprising a support paper having a surface coated with: a hot-melt layer comprising a thermoplastic polymer having a melting point in the range of 60° to 180° C.; substantially opaque layer (a) comprising a polyurethane binder and inorganic white pigment; and ink-receptive layer (b) comprising a polyurethane binder and organic polymeric particles, b) printing an image on the coated layers with an ink-jet printer, c) removing the support paper from the imaged coated layers, d) placing the imaged coated layers on a fabric material, e) placing a protective paper over the imaged coated layers on the fabric material, and f) ironing the protective paper, whereby the image is transferred to the fabric.

15. The method of claim 14, wherein the protective paper is a transparent silicone-coated paper.

16. The method of claim 15, wherein the imaged coated layers are placed on the fabric material so that the image faces upwards.

17. The method of claim 14, wherein the fabric material is a black colored T-shirt.

* * * * *